P. C. JUHL.
COMBINATION TRACTOR AND REPELLER.
APPLICATION FILED JULY 15, 1919.
1,337,841. Patented Apr. 20, 1920.
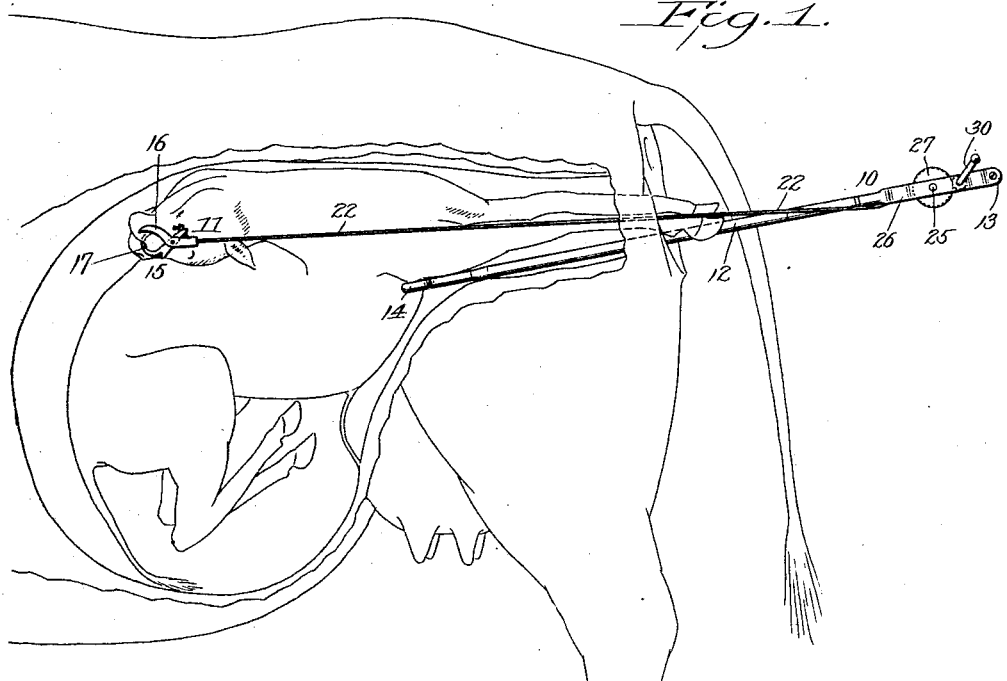
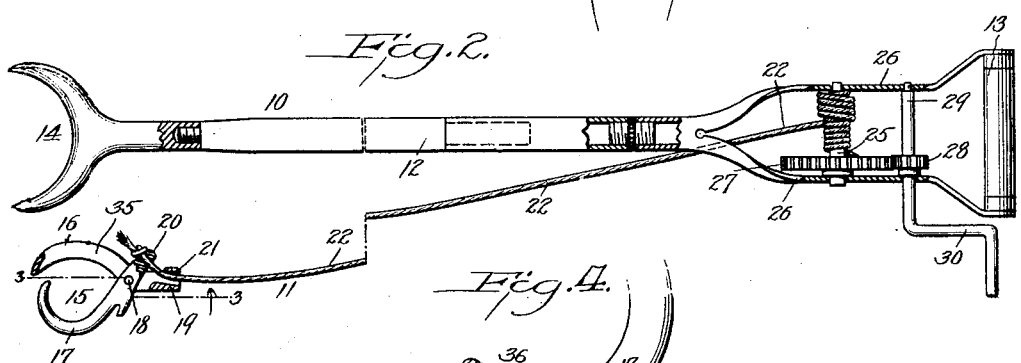
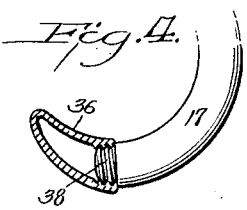
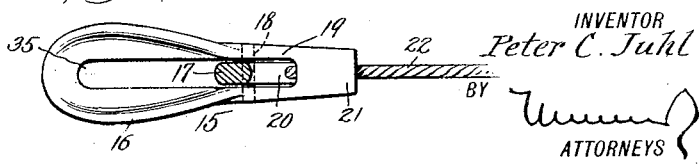

UNITED STATES PATENT OFFICE.

PETER C. JUHL, OF NEW YORK, N. Y.

COMBINATION TRACTOR AND REPELLER.

1,337,841.  Specification of Letters Patent.  Patented Apr. 20, 1920.

Application filed July 15, 1919. Serial No. 310,899.

*To all whom it may concern:*

Be it known that I, PETER C. JUHL, a citizen of the United States, and a resident of the city of New York, Richmond Valley, borough of Richmond, in the county of Richmond and State of New York, have invented a new and Improved Combination Tractor and Repeller, of which the following is a full, clear, and exact description.

The invention relates to obstetrical instruments, and its object is to provide a new and improved combination tractor and repeller more especially designed for use by veterinary surgeons on cows, horses and other animals with a view to adjust abnormal positions of a fetus. Another object is to enable the veterinary surgeon to readily apply and manipulate the instrument. Another object is to provide an obstetrical instrument which is simple and durable in construction and not liable to get easily out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the obstetrical instrument as applied to adjust an abnormally positioned fetus in a cow;

Fig. 2 is an enlarged plan view of the obstetrical instrument with parts shown in section;

Fig. 3 is an enlarged sectional side elevation of the clamping device, the section being on the line 3—3 of Fig. 2;

Fig. 4 is an enlarged side elevation of one of the jaws of the tractor provided with a removable point, the latter being shown in section; and Fig. 5 is a perspective view of a removable jaw point of different shape.

The obstetrical instrument illustrated in Figs. 1 and 2 consists essentially of a repeller 10 and tractor 11, of which the repeller 10 is in the form of a stick 12, preferably made in sections, screwed together or otherwise detachably fastened together to permit of separating the sections and conveniently carrying the same about as a small bundle. The stick 12 is provided at the rear end with a handle 13 and at the forward end with a crotch 14 adapted to be seated on a part of the mother's body or on a part of a fetus for repelling purposes. The tractor 11 comprises essentially a clamp 15 having jaws or clamping members 16 and 17 connected with each other by a pivot 18 to permit the jaws to swing toward each other with a view to clamp a part of the fetus to be drawn from an abnormal into a proper position or to pull the fetus out of the womb.

The jaws 16 and 17 are provided with rearwardly extending members 19 and 20, of which the member 19 is provided with an eye 21 for the passage of a cord, rope or other flexible connection 22 secured at its forward end to the other member 20. On exerting a rearward pull on the flexible connection 22, a swinging motion is given to the jaws 16 and 17 to close the same for gripping or clamping purposes. The rear end of the flexible connection 22 winds on a drum 25 journaled in the rear forked portion 26 of the stick 12. On the drum 25 is secured a gear wheel 27 in mesh with a pinion 28 secured on a shaft 29 journaled in the forked portion 26. One end of the shaft 29 is provided with a crank arm 30 under the control of a veterinary surgeon or other person to turn the shaft 29 and hence the drum 25 with a view to wind up the flexible connection 22 and thus exert a rearward pull on the clamp 15 for the purpose above mentioned.

In practice, the jaw 17 is preferably made in the form of a hook, and jaw 16 is preferably made in the form of a spoon bowl provided in its bottom with a lengthwise extending slot 35 (see Fig. 3) for the passage of the other jaw 17. By the arrangement described a large amount of flesh can be readily grasped and gripped between the jaws 16 and 17 to give a strong hold on the part to be pulled. The hook jaw 17 is preferably provided with removable and interchangeable points or cheeks 36 and 37 of various shapes and such as shown, for instance, in Figs. 4 and 5. The points or cheeks 36 or 37 are preferably screwed on to a reduced threaded stud 38 on the jaw 17.

It will be noticed that by the combined use of the tractor and repeller, a veterinary surgeon is enabled to adjust an abnormally positioned fetus in the womb without injury to the mother. The repeller may be used without the tractor for pushing the fetus or parts thereof around in the womb until the desired position of the fetus is obtained.

Although the combined tractor and repeller is shown and described for use on animals, I do not limit myself to such application, as it may be used on the female human body.

Having thus described my invention, I claim as new and desire to secure by Letters Patent:—

1. An obstetrical instrument, comprising a repeller provided at its forward end with a crotch, a tractor having a clamp provided with jaws pivotally connected with each other, and a flexible connection guided in one jaw and attached to the other jaw to close the jaws on exerting a pull on the flexible connection, and a drum mounted on the rear of the said repeller and on which winds the said flexible connection.

2. An obstetrical instrument, comprising a repeller provided at its forward end with a crotch, a tractor having a clamp provided with jaws pivotally connected with each other, a flexible connection guided in one jaw and attached to the other jaw to close the jaws on exerting a pull on the flexible connection, a drum mounted on the rear end of the said repeller and on which winds the said flexible connection, and a manually controlled gearing mounted on the said repeller and connected with the said drum to rotate the latter.

3. In an obstetrical instrument, a tractor comprising a clamp having pivoted clamping members, of which one is spoon-shaped and provided with a slot, the other clamping member being hook-shaped and coacting with the said spoon-shaped clamping member, the said hook-shaped clamping member having a removable and interchangeable point.

PETER C. JUHL.